United States Patent
Falconer et al.

(10) Patent No.: US 10,759,433 B2
(45) Date of Patent: Sep. 1, 2020

(54) VEHICLE ESCAPE

(71) Applicant: Ford Global Technologies, LLC, Dearborn, MI (US)

(72) Inventors: William Falconer, Detroit, MI (US); Zachary Konchan, Westland, MI (US); Leonard Eber Carrier, Dearborn, MI (US); Erick Michael Lavoie, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 372 days.

(21) Appl. No.: 15/978,983

(22) Filed: May 14, 2018

(65) Prior Publication Data
US 2019/0111932 A1 Apr. 18, 2019

Related U.S. Application Data

(63) Continuation-in-part of application No. 15/784,432, filed on Oct. 16, 2017, now Pat. No. 10,613,539.

(51) Int. Cl.
*B60W 30/18* (2012.01)
*B60W 40/06* (2012.01)
(Continued)

(52) U.S. Cl.
CPC .... *B60W 30/18172* (2013.01); *B60W 30/188* (2013.01); *B60W 40/06* (2013.01);
(Continued)

(58) Field of Classification Search
CPC .. B60W 40/064; B60W 30/188; B60W 10/18; B60W 30/18172; B60W 10/06; B60W 10/11; B60W 30/02; B60W 10/184; B60W 50/12; B60W 50/10; B60W 40/06; B60W 2554/00; B60W 2552/40; B60W 2420/52; B60W 2520/26; B60W 40/068;
(Continued)

(56) References Cited

U.S. PATENT DOCUMENTS 5,735,362 A * 4/1998 Hrovat ................ B60K 28/16
180/197
6,356,837 B1 3/2002 Yokota et al.
(Continued)

FOREIGN PATENT DOCUMENTS

EP 2507112 B1 12/2013
JP 2009078592 A 4/2009
(Continued)

OTHER PUBLICATIONS

Non-Final Office Action dated Jun. 28, 2019 for U.S. Appl. No. 15/784,432 (19 pages).

*Primary Examiner* — Behrang Badii
(74) *Attorney, Agent, or Firm* — Frank A. MacKenzie; Bejin Bieneman PLC

(57) ABSTRACT

A map, including potential obstacles, can be generated by a computing device in a vehicle. An estimated coefficient of friction between the vehicle wheels and a roadway surrounding a stuck vehicle can be generated based on sensor data. A path can be determined based on the map, and the stuck vehicle can be operated based on the path and a determined slip ratio based on the vehicle wheels to unstick the stuck vehicle.

20 Claims, 8 Drawing Sheets

(51) Int. Cl.
  *B60W 30/188* (2012.01)
  *B60W 10/11* (2012.01)
  *B60W 10/06* (2006.01)
(52) U.S. Cl.
  CPC ............ *B60W 10/06* (2013.01); *B60W 10/11* (2013.01); *B60W 2420/52* (2013.01); *B60W 2520/26* (2013.01); *B60W 2552/40* (2020.02); *B60W 2554/00* (2020.02)
(58) Field of Classification Search
  CPC ........ B60T 8/4809; B60T 8/172; B60T 8/175; B60T 8/48; B60T 17/22; B60T 11/04; B60T 8/3205; F02D 11/10; F02D 41/2422; F02D 41/021; F02D 11/105; B60K 28/165; B60K 28/16; B60K 26/04; F16H 61/143
  See application file for complete search history.

(56) References Cited

U.S. PATENT DOCUMENTS

| | | | |
|---|---|---|---|
| 6,917,878 B2 | 7/2005 | Pechatnikov et al. | |
| 7,571,044 B2 | 8/2009 | Brown et al. | |
| 8,925,830 B2 * | 1/2015 | Brown, Jr. | B66F 3/24 238/14 |
| 8,996,224 B1 | 3/2015 | Herbach et al. | |
| 9,688,279 B2 | 6/2017 | Kelly et al. | |
| 9,815,476 B2 | 11/2017 | Lynch | |
| 2003/0229441 A1 | 12/2003 | Pechatnikov et al. | |
| 2004/0227341 A1 * | 11/2004 | Hattori | B60R 22/24 280/801.1 |
| 2010/0191434 A1 * | 7/2010 | Fujita | B60W 30/188 701/91 |
| 2011/0035126 A1 * | 2/2011 | Ishikawa | B60W 10/11 701/65 |
| 2015/0291170 A1 | 10/2015 | Mair et al. | |
| 2018/0217050 A1 | 8/2018 | Heil et al. | |

FOREIGN PATENT DOCUMENTS

| | | |
|---|---|---|
| JP | 2009100566 A | 5/2009 |
| JP | 2015233378 A | 12/2015 |
| JP | 2016193698 A | 11/2016 |
| WO | 201356723 A1 | 4/2013 |

* cited by examiner

VEHICLE ESCAPE

CROSS-REFERENCE TO RELATED APPLICATIONS

This patent application is a continuation-in-part of and claims priority to and all advantages of U.S. patent application Ser. No. 15/784,432 filed on Oct. 16, 2017, which is herein incorporated by reference in its entirety.

BACKGROUND

The Society of Automotive Engineers (SAE) has defined multiple levels of autonomous vehicle operation. At levels 0-2, a human driver monitors or controls the majority of the driving tasks, often with no help from the vehicle. For example, at level 0 ("no automation"), a human driver is responsible for all vehicle operations. At level 1 ("driver assistance"), the vehicle sometimes assists with steering, acceleration, or braking, but the driver is still responsible for the vast majority of the vehicle control. At level 2 ("partial automation"), the vehicle can control steering, acceleration, and braking under certain circumstances without human interaction. At levels 3-5, the vehicle assumes more driving-related tasks. At level 3 ("conditional automation"), the vehicle can handle steering, acceleration, and braking under certain circumstances, as well as monitoring of the driving environment. Level 3 requires the driver to intervene occasionally, however. At level 4 ("high automation"), the vehicle can handle the same tasks as at level 3 but without relying on the driver to intervene in certain driving modes. At level 5 ("full automation"), the vehicle can handle almost all tasks without any driver intervention.

DETAILED DESCRIPTION

Figure 1:
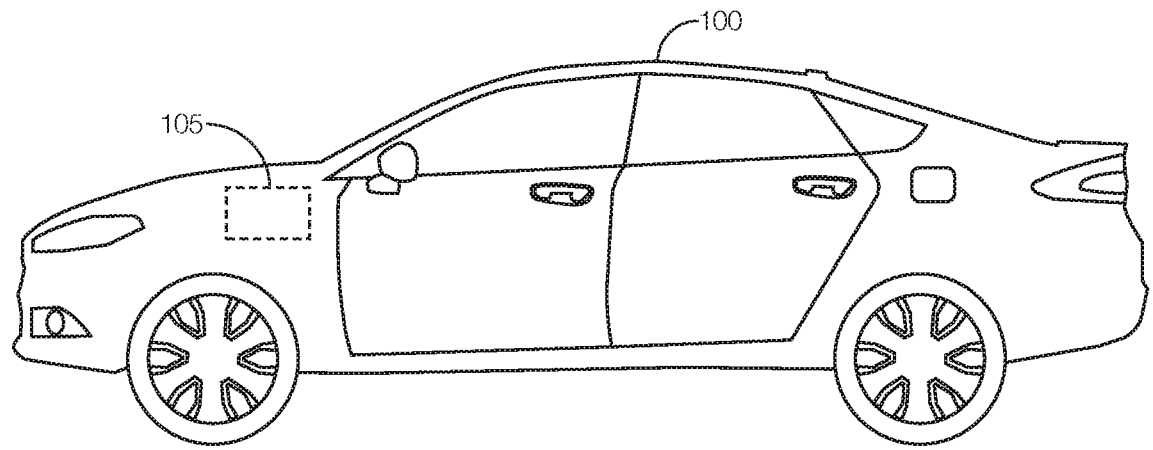
FIG. 1 illustrates an example autonomous vehicle with an autonomous vehicle controller that can plan a vehicle trajectory to a high friction surface as part of a slip control process.

Vehicles can be equipped to operate in both autonomous and occupant piloted mode. In addition to the levels of autonomous control discussed above, a semi- or fully-autonomous mode of operation can be defined as a mode of operation wherein a vehicle can be piloted by a computing device as part of a vehicle information system having sensors and controllers. The vehicle can be occupied or unoccupied, but in either case the vehicle can be piloted without assistance of an occupant. For purposes of this disclosure, an autonomous mode is defined as one in which each of vehicle propulsion (e.g., via a powertrain including an internal combustion engine and/or electric motor), braking, and steering are controlled by one or more vehicle computers; in a semi-autonomous mode the vehicle computer(s) control(s) one or two of vehicle propulsion, braking, and steering. In a non-autonomous vehicle, none of these are controlled by a computer.

Disclosed herein is a method, including generating a map including obstacles and an estimated coefficient of friction between vehicle wheels and a roadway surrounding a stuck vehicle based on sensor data. A path can be determined based on the map and the stuck vehicle can be operated based on the path and a slip control process based on the vehicle wheels. The estimated coefficient of friction between the vehicle wheels and the roadway can be lower than a value that was empirically determined to permit operation of the stuck vehicle. A slip ratio can be determined based on vehicle wheel motion parallel to the roadway and vehicle wheel rotation to determine the slip control process. Determining the slip control process can permit the stuck vehicle to operate based on the path and a determined slip ratio despite the estimated coefficient of friction.

Matching a slip ratio of vehicle wheels can determine the stuck vehicle is unstuck. Generating the map can include generating a first map based on vehicle sensor data including obstacles. Generating the map can include generating a second map based on vehicle sensor data including estimating coefficients of friction for locations surrounding the stuck vehicle. Combining the first map and the second map can determine the path based on the combined first map and second map. Vehicle sensor data can include passive sensor data and active sensor data. The passive sensor data can include color video data. The active sensor data can include LIDAR data or RADAR data. The active and passive sensor data can be combined to form the map by orthographic projection. A path based on the map can includes determining where the vehicle can operate while avoiding obstacles with some buffer.

Further disclosed is a computer readable medium, storing program instructions for executing some or all of the above method steps. Further disclosed is a computer programmed for executing some or all of the above method steps, including a computer apparatus, programmed to generate a map including obstacles and an estimated coefficient of friction between vehicle wheels and a roadway surrounding a stuck vehicle based on sensor data. A path can be determined based on the map and the stuck vehicle can be operated based on the path and a slip control process based on the vehicle wheels. The estimated coefficient of friction between the vehicle wheels and the roadway can be lower than a value that was empirically determined to permit operation of the stuck vehicle. A slip ratio can be determined based on vehicle wheel motion parallel to the roadway and vehicle wheel rotation to determine the slip control process. Determining the slip control process can permit the stuck vehicle to operate based on the path and a determined slip ratio despite the estimated coefficient of friction.

The computer can be further programmed to match a slip ratio of vehicle wheels can determine the stuck vehicle is unstuck. Generating the map can include generating a first map based on vehicle sensor data including obstacles. Generating the map can include generating a second map based on vehicle sensor data including estimating coefficients of friction for locations surrounding the stuck vehicle. Combining the first map and the second map can determine the path based on the combined first map and second map.

Vehicle sensor data can include passive sensor data and active sensor data. The passive sensor data can include color video data. The active sensor data can include LIDAR data or RADAR data. The active and passive sensor data can be combined to form the map by orthographic projection. A path based on the map can includes determining where the vehicle can operate while avoiding obstacles with some buffer.

Vehicles can be equipped with computing devices, networks, sensors and controllers to acquire information regarding the vehicle's environment and to operate the vehicle based on the information. Safe and comfortable operation of the vehicle can depend upon acquiring accurate and timely information regarding the vehicle's environment. Vehicle sensors can provide data concerning routes and objects to be avoided in the vehicle's environment. Safe and efficient operation of a vehicle can include estimating a coefficient of friction between the vehicle's wheels and a roadway to determine whether operation of the vehicle is permitted. In examples where the coefficient of friction between the vehicle's wheels and the roadway is low, the vehicle's wheels can slip, thereby causing the vehicle to be "stuck", and therefore unable to operate to reach a destination. In this example, a computing device included in the vehicle can estimate that the coefficient of friction is lower than an empirically determined value based on determining slip ratios for the vehicle's wheels. When the coefficient of friction is too low to permit operation of the vehicle according to "usual" or non-slip control means to reach a destination, the vehicle can operate using a slip control process as described herein to permit operation of the vehicle despite an estimated coefficient of friction that is lower than an empirically determined value.

A computing device in a vehicle can be programmed to acquire data regarding the external environment of vehicle and to use the data to determine trajectories to be used to operate a vehicle from a current location to a destination location, for example, where a trajectory is a vector that describes the motion of a vehicle including location, direction, and rate of change in direction and speed. The data can include RADAR, LIDAR, and video sensors including visible and infrared (IR), for example. The term "trajectory" will be used interchangeably with the term "path" herein. A vehicle can use on-board sensors to generate a real-time map including locations surrounding the vehicle and plan a trajectory based on the real-time map, where a real-time map is defined as a map that includes data determined within a recent time, for example a few seconds or less, before being used in a map. A trajectory can include locations, speeds, directions, and lateral and longitudinal accelerations of a vehicle that describe a path upon which a vehicle can be operated.

In examples where a vehicle is stuck, for example in mud or deep snow, etc., a computing device can use the real-time map of the surroundings to plan a trajectory that will have the highest probability of freeing the vehicle and thereby permit the vehicle to operate to reach an intended destination by "unsticking" a vehicle, where unsticking a vehicle can include executing a slip control process, wherein a vehicle's steering, braking and powertrain are controlled by the processor so as to overcome the low friction between a vehicle's wheels and a roadway that make a vehicle stuck. In other examples, the vehicle can use data downloaded from the cloud via the Internet, for example, to determine surface conditions for locations surrounding the vehicle. The vehicle can use data regarding the slip ratios of driven and undriven wheels to determine when the vehicle is "unstuck" and can resume usual, non-slip control operation. This can occur when the vehicle reaches the endpoint of its intended path with the driven wheel linear speed matching its rotational speed, meaning that the driven wheel is not slipping. Another way to describe this is when a non-driven wheel slip ratio matches a driven wheel slip ratio, for example.

In an example, the computing device is programmed to generate a composite map to include locations of obstacles. The computing device may be programmed to autonomously navigate the vehicle to the selected high friction surface via a determined trajectory while avoiding the obstacles. Alternatively, or in addition, the computing device may be programmed to generate the composite map by generating a first map that includes the locations of the obstacles. In that implementation, the computing device may be programmed to generate the composite map by generating the first map to include a range of trajectories of the vehicle. Alternatively, or in addition, the computing device can be programmed to generate the composite map by generating a second map that includes the locations of the plurality of high friction surfaces. In that possible approach, the processor can be programmed to generate the composite map by combining portions of the first map and the second map. Combining portions of the first map and the second map can include incorporating the plurality of high friction surfaces from the second map and the locations of the obstacles from the first map into the composite map. The computing device can be programmed to determine whether the vehicle has arrived at the selected high friction surface. In that instance, the computing device may be programmed to stop executing the slip control process as a result of determining that the vehicle has reached the selected high friction surface.

As illustrated in FIG. 1, an autonomous vehicle 100 includes a computing device 105 programmed to control various autonomous vehicle operations. For instance, as explained in greater detail below, the computing device 105 is programmed to receive sensor signals and output signals to various actuators located throughout the vehicle 100. By controlling the actuators, the computing device 105 can autonomously provide longitudinal and lateral control of the vehicle 100. That is, the computing device 105 can control propulsion, braking, and steering of the vehicle 100.

Further, as explained in greater detail below, the computing device 105 is programmed to detect objects near the vehicle 100. The objects may include other vehicles, pedestrians, road signs, lane markings, etc. The computing device 105 is programmed to detect surfaces with low friction (referred to as a "low friction surface," a "low μ surface," or a "low mu surface") and high friction (referred to as a "high friction surface," a "high μ surface," or a "high mu surface"). In some instances, the computing device 105 is programmed to predict the surface friction of an area near the vehicle 100, including an area ahead of the vehicle 100, adjacent to the vehicle 100, behind the vehicle 100, or a combination thereof. The computing device 105 may be programmed to develop a trajectory from a low friction surface to a high friction surface given the obstacles between the vehicle 100 and the high friction surface.

Although illustrated as a sedan, the vehicle 100 may include any passenger or commercial automobile such as a car, a truck, a sport utility vehicle, a crossover vehicle, a van, a minivan, a taxi, a bus, etc. As discussed in greater detail below, the vehicle 100 is an autonomous vehicle that can operate in an autonomous (e.g., driverless) mode, a partially autonomous mode, and/or a non-autonomous mode. The partially autonomous mode may refer to the SAE Level 2 mode of operation where the vehicle 100 can control steering, acceleration, and braking under certain circumstances without human interaction. The partially autonomous mode may further refer to the SAE Level 3 mode of operation where the vehicle 100 can handle steering, acceleration, and braking under certain circumstances, as well as monitoring of the driving environment, even though some human interaction is sometimes needed.

Figure 2:
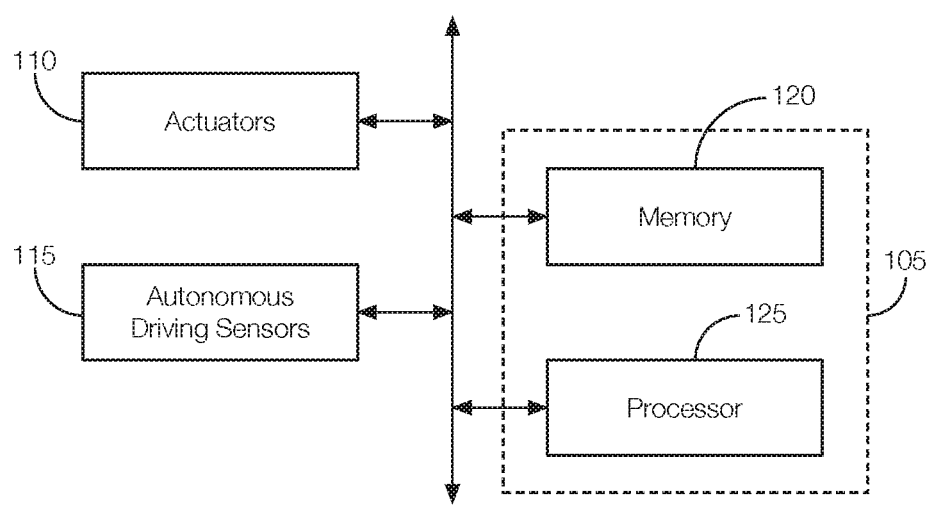
FIG. 2 is a block diagram illustrating example components of the vehicle.

FIG. 2 is a block diagram showing example components of the vehicle 100. The components shown in FIG. 2 include actuators 110, autonomous driving sensors 115, a memory 120, and a computing device 105. Each actuator 110 is controlled by control signals output by the computing device 105. Electrical control signals output by the computing device 105 may be converted into mechanical motion by the actuator 110. Examples of actuators 110 may include a linear actuator, a servo motor, an electric motor, or the like. Each actuator 110 may be associated with a particular longitudinal or lateral vehicle control. For instance, a propulsion actuator may control the acceleration of the vehicle 100. That is, the propulsion actuator may control the throttle that controls airflow to the engine. In the case of electric vehicles or hybrid vehicles, the propulsion actuator may be, or otherwise control the speed of, an electric motor. A brake actuator may control the vehicle brakes. That is, the brake actuator may actuate the brake pads to slow the vehicle wheels. A steering actuator may control the rotation of the steering wheel or otherwise control the lateral movement of the vehicle 100, including facilitating turns. Each actuator 110 may control its respective vehicle subsystem based on signals output by, e.g., the computing device 105.

The autonomous driving sensors 115, or simply sensors 115 herein, are implemented via circuits, chips, or other electronic components that are programmed to detect objects external to the vehicle 100. For example, the sensors 115 may include radar sensors, scanning laser range finders, light detection and ranging (LIDAR) devices, ultrasonic sensors, and image acquiring sensors such as video cameras. Each autonomous driving sensor may be programmed to output signals representing objects detected by the sensor. For instance, the sensors 115 may be programmed to output signals representing objects such as other vehicles, pedestrians, road signs, lane markers, and other objects. Some sensors 115 may be implemented via circuits, chips, or other electronic components that can detect certain internal states of the vehicle 100. Examples of internal states may include wheel speed, wheel orientation, and engine and transmission variables. Further, the sensors 115 may detect the position or orientation of the vehicle using, for example, global positioning system (GPS) sensors; accelerometers such as piezoelectric or microelectromechanical systems (MEMS) sensors; gyroscopes such as rate, ring laser, or fiber-optic gyroscopes; inertial measurements units (IMU); and magnetometers. The sensors 115, therefore, may output signals representing the internal vehicle state, the position or orientation of the vehicle 100, or both. The sensors 115 may be programmed to output the signals to the computing device 105 so the computing device 105 can autonomously control the vehicle 100, including detecting when the vehicle 100 is traveling on a low friction surface, estimating the locations of high friction surfaces, and developing a trajectory to one of the high friction surfaces given any nearby obstacles.

The memory 120 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 120 may store instructions executable by the computing device 105 as well as other data. The instructions and data stored in the memory 120 may be accessible to the computing device 105 and possibly other components of the vehicle 100.

The processor 125 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The computing device 105 can receive and process the data from the sensors 115 and, from the sensor data, determine whether the vehicle 100 is on a low friction surface, estimate where high friction surfaces are located, locate obstacles near the vehicle 100, select one of the high friction surfaces, develop a trajectory from the present location of the vehicle 100 to one of the high friction surfaces, and autonomously navigate the vehicle 100 to the high friction surface while avoiding the detected obstacles.

In some instances, the computing device 105 may be programmed to determine that the vehicle 100 is stuck on a low friction surface such as in snow, mud, or on ice. The computing device 105 may determine that the vehicle 100 is stuck on a low friction surface based on signals output by a slip controller. Computing device 105 can determine that the vehicle 100 is stuck when a coefficient of friction between the vehicle 100 wheels and the surface or roadway upon which the vehicle 100 is operating a determined based on signals output by a slip controller is lower than a value previously determined empirically. Alternatively, the computing device 105 may be programmed to operate as a slip controller. As such, the computing device 105 may be programmed to determine that the vehicle 100 is stuck on a low friction surface based on a slip calculation, which may be calculated from, e.g., wheel torque, wheel speed, or other internal vehicle characteristics, relative to a target slip. The difference between the slip calculation and the target slip may be referred to as a "slip error." The computing device 105 may be programmed to conclude that the vehicle 100 is on a low friction surface when the slip error is above a predetermined threshold. Moreover, in a slip control process, the computing device 105 may be programmed to use the slip error to determine if the vehicle 100 is making progress trying to escape the low friction surface. That is, during the slip control process, the computing device 105 may try to keep the wheel torque and speed at a certain slip target to keep up momentum, and thus continue to make progress, on the low friction surface.

The computing device 105 may be programmed to generate one or more maps after determining that the vehicle 100 is on a low friction surface but before and while attempting to move to a high friction surface. Each map may include the locations of high friction surfaces, the locations of detected objects, the locations of low friction surfaces, estimated locations of high friction surfaces, estimated locations of low friction surfaces, a path the vehicle 100 can travel, or a combination thereof. In some instances, the computing device 105 may be programmed to generate a composite map that includes, e.g., the estimated locations of high friction surfaces and the detected obstacles. The computing device 105 may be programmed to generate the composite map after selecting one of the high friction surfaces.

The computing device 105 may be programmed to output control signals to the actuators 110 to navigate the vehicle 100 to the selected high friction surface according to the composite map. That is, the computing device 105 may be programmed to develop a trajectory, from the composite map, from the present location of the vehicle 100 to the location of the selected high friction surface. The computing device 105 may be programmed to develop the trajectory in a way that the vehicle 100 avoids the detected obstacles. Developing the trajectory may include the computing device 105 outputting certain control signals at certain times to one or more of the actuators 110. The control signals output by the computing device 105 cause the actuators 110 to manipulate, e.g., the throttle, brakes, and steering wheel to navigate the vehicle 100 from its present location to one of the high friction surfaces (i.e., the selected high friction surface) while avoiding the detected obstacles. In some instances, the control signals output by the computing device 105 implement the slip control process to escape the low friction surface and direct the vehicle 100 toward the high friction surface.

Figure 3:
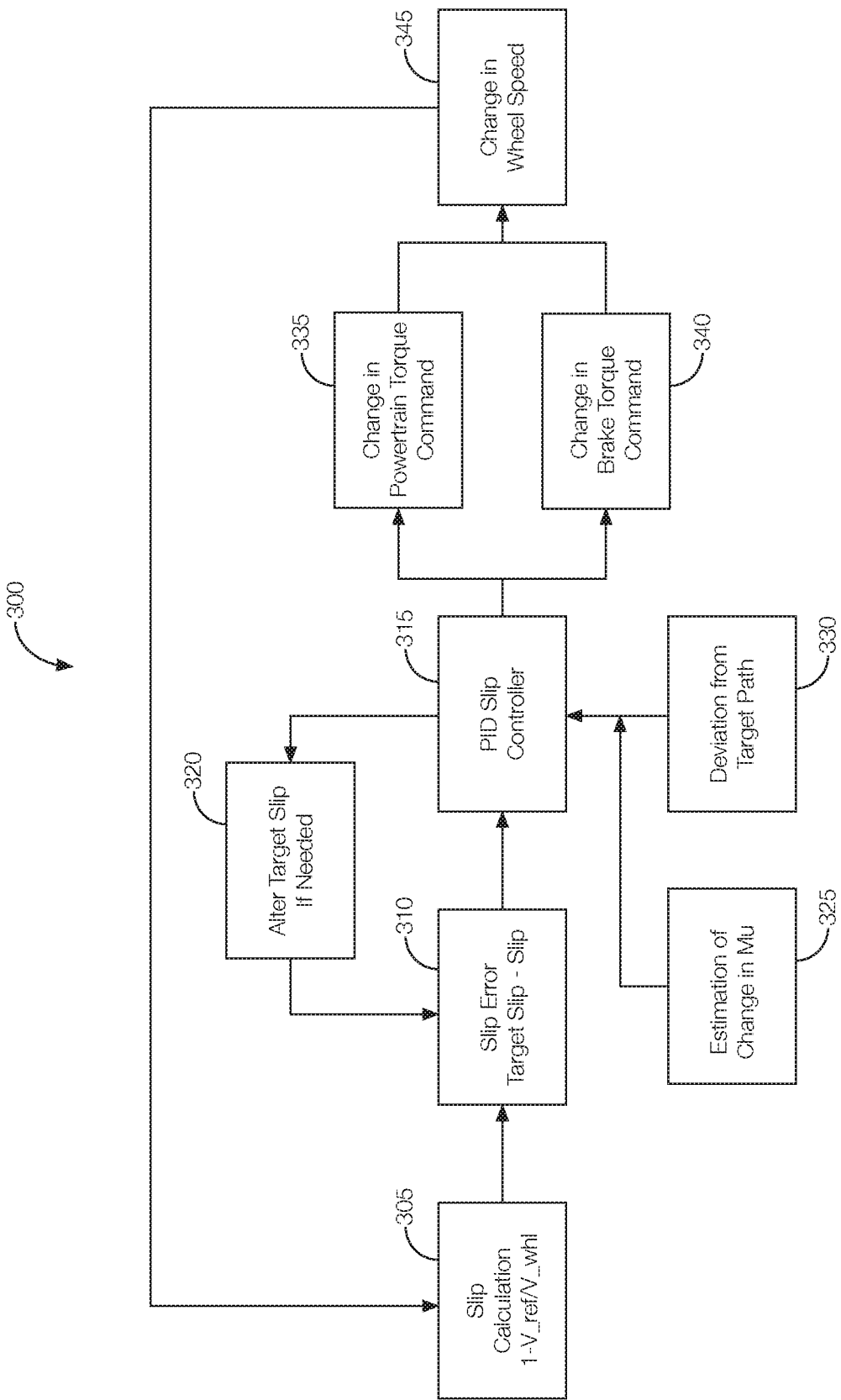
FIG. 3 is a control diagram illustrating various operations of the autonomous vehicle controller during the slip control process.

FIG. 3 is a control diagram 300 illustrating an example slip control process that may be executed by the computing device 105 when acting as a slip controller. At block 305, the computing device 105 performs a slip calculation. The slip calculation may be a function of the vehicle speed ($V_{ref}$) and wheel speed ($V_{whl}$). Specifically, the slip calculation may be defined as:

$$\text{slip} = 1 - \frac{V_{ref}}{V_{whl}} \qquad (1)$$

At block 310, the computing device 105 may calculate the slip error. The slip error may be the difference of the target slip value relative to the slip calculated at Equation (1). Block 315 represents a PID slip controller. The output of the PID slip controller includes control signals for the powertrain torque and brake torque given the slip error determined at block 310 as well as other inputs such as the estimation of change in surface friction (block 325) and the deviation from the target path (block 330). Another output of the PID slip controller includes a change to the target slip value (block 320). The computing device 105 determines how the change in powertrain torque and brake torque (blocks 335 and 340, respectively) affect the wheel speed (block 345). The change in wheel speed is fed back to block 305 so the new slip can be calculated, a new slip error can be determined, and new output signals can be used to control the powertrain and brakes. Thus, the computing device 105 can control the vehicle 100 to the present slip target and shifting the vehicle gears to gain momentum over successive iterations. Further, as the vehicle 100 reaches surfaces with higher friction, the computing device 105 may apply more steering, acceleration, and braking controls, as well as controlling the vehicle 100 according to a lower slip target.

The computing device 105 may stop executing the control diagram 300 when the vehicle 100 reaches the endpoint of its intended path with the non-driven wheel speeds matching the driven wheel speeds. In some possible approaches, the computing device 105 may be programmed to deactivate the slip control (e.g., terminate execution of the control diagram 300) if certain exit conditions are met. The exit conditions may be based on driver inputs, an imminent collision, a collision that occurs, a low battery condition, a low fuel condition, the computing device 105 fails to free the vehicle 100 after a predetermined number of attempts, etc.

Figure 7:
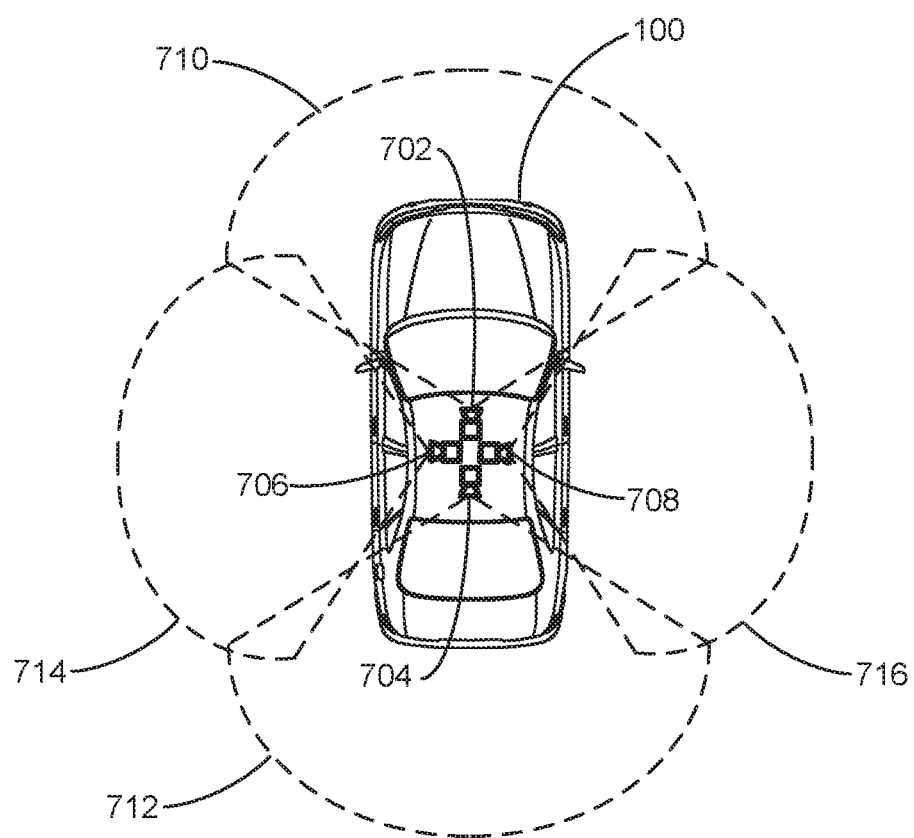
FIG. 7 illustrates and example vehicle with sensors.

FIG. 7 is a diagram of an example vehicle 100 including a front-facing sensor 702, a rear-facing sensor 704, a left-facing sensor 706 and a right-facing sensor 708. The front-facing sensor 702, rear-facing sensor 704, left-facing sensor 706 and right-facing sensor 708 will also be referred to collectively as sensors 115 or simply sensors 115 herein. The sensors 115 each have a respective field of view 710, 712, 714, 716, which are areas surrounding vehicle 100 within which each of the sensors 115 can acquire sensor data regarding the environment surrounding vehicle 100. Sensors 115 can include color video sensors 115, infrared (IR) video sensors 115, LIDAR sensors 115, RADAR sensors 115, etc., wherein a sensor 115 can acquire passive sensor data or active sensor data from areas surrounding a vehicle 100 represented by fields of view 710, 712, 714, 716 respectively.

Passive sensor data can be sensor data based on acquiring natural or artificial radiant energy, e.g. sunlight, streetlights, etc. reflected or refracted by surfaces in the environment surrounding a vehicle 100 onto a sensor 115 and thereby be acquired by sensor 115 and communicated to computing device 105. Color video data from a color video sensor 116 is an example of a passive sensor data. Although natural and artificial radiant energy can be augmented by vehicle 100 headlights for night or low light conditions, for example, color video data is considered passive sensor data. Active sensor data can be sensor data based on acquiring radiant energy emitted by vehicle 100 in forms not acquired as passive sensors data, e.g. IR lights, LIDAR IR pulses, RADAR microwave pulses, etc. Emitted radiant energy can be reflected and refracted back onto a sensor 116 by surfaces in the environment surrounding the vehicle 100 and acquired as active sensor data. For example, an IR video camera can filter out visible light wavelengths and acquire only IR light wavelengths. The IR light can be supplied by IR lights included in vehicle 125. The IR lights can include light emitting diodes (LEDs) that emit IR light that is reflected and refracted back to vehicle 100 and IR video sensor 100 that acquires the reflected and refracted IR light a IR video data to be communicated to computing device 105.

Additionally, some sensors 1115 may be mounted inside of vehicle 100 or in the body of the vehicle 100 (such as, the engine compartment, the wheel wells, etc.) to measure properties in the interior of the vehicle 100. For example, such sensors 115 can include accelerometers, odometers, tachometers, pitch and yaw sensors, wheel speed sensors, microphones, tire pressure sensors, biometric sensors, suspension vibration sensors, etc. These sensors 115 produce signals that can be analyzed to determine the type of surface that the vehicle 100 is currently on. For example, proximity sensors 115 can produce proximity data by emitting ultrasonic sound waves that reflect and refract off surfaces and are acquired by the proximity sensor 115 to determine a distance to surfaces surrounding vehicle 100. The acquired proximity data can be further analyzed by computing device 105 to determine aspects of the surface texture of the reflecting surface.

Figure 4A:
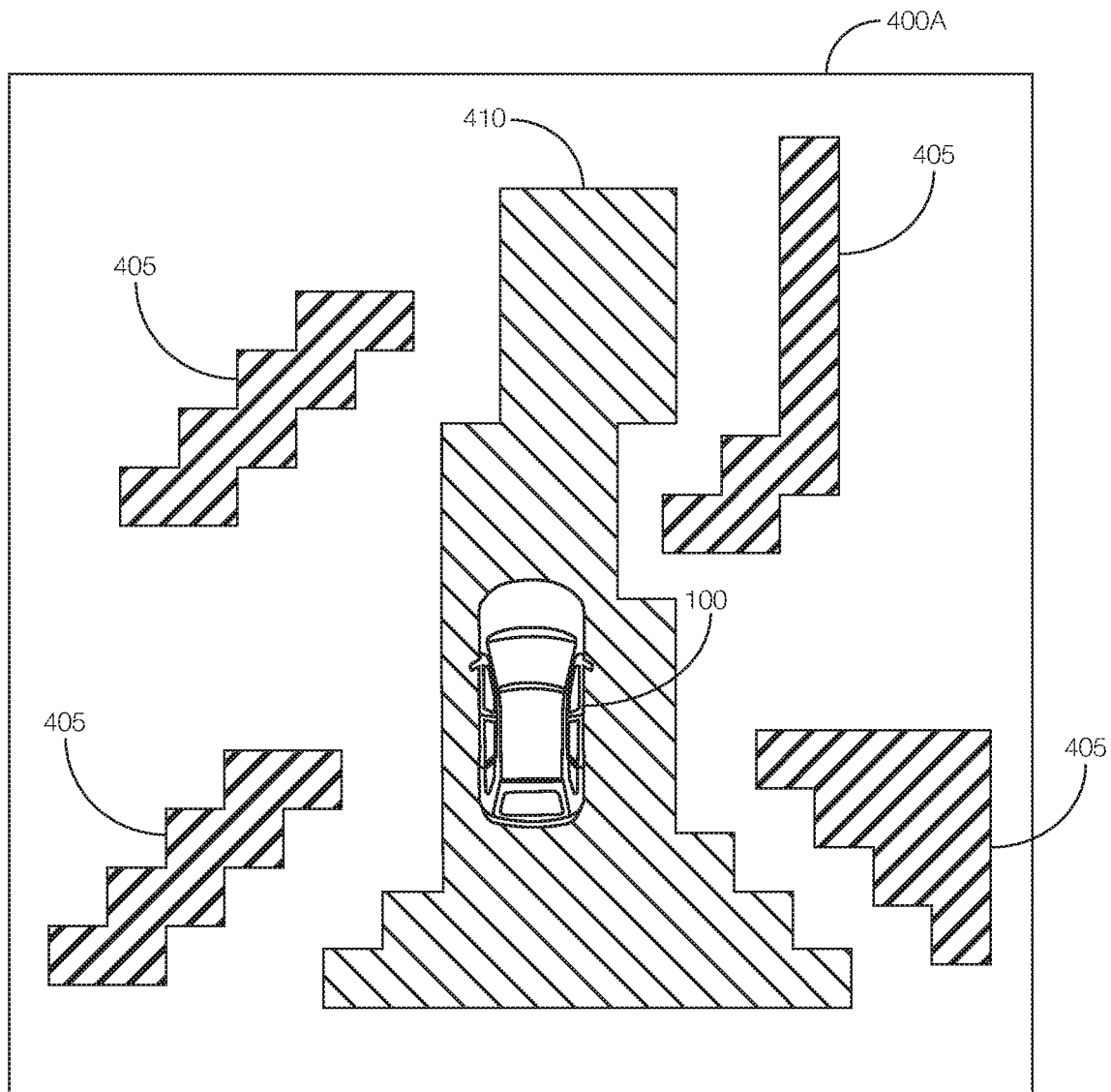
FIGS. 4A-4C illustrate maps generated by the autonomous vehicle controller to develop the vehicle trajectory to the high friction surface and avoid detected obstacles.
Figure 4B:
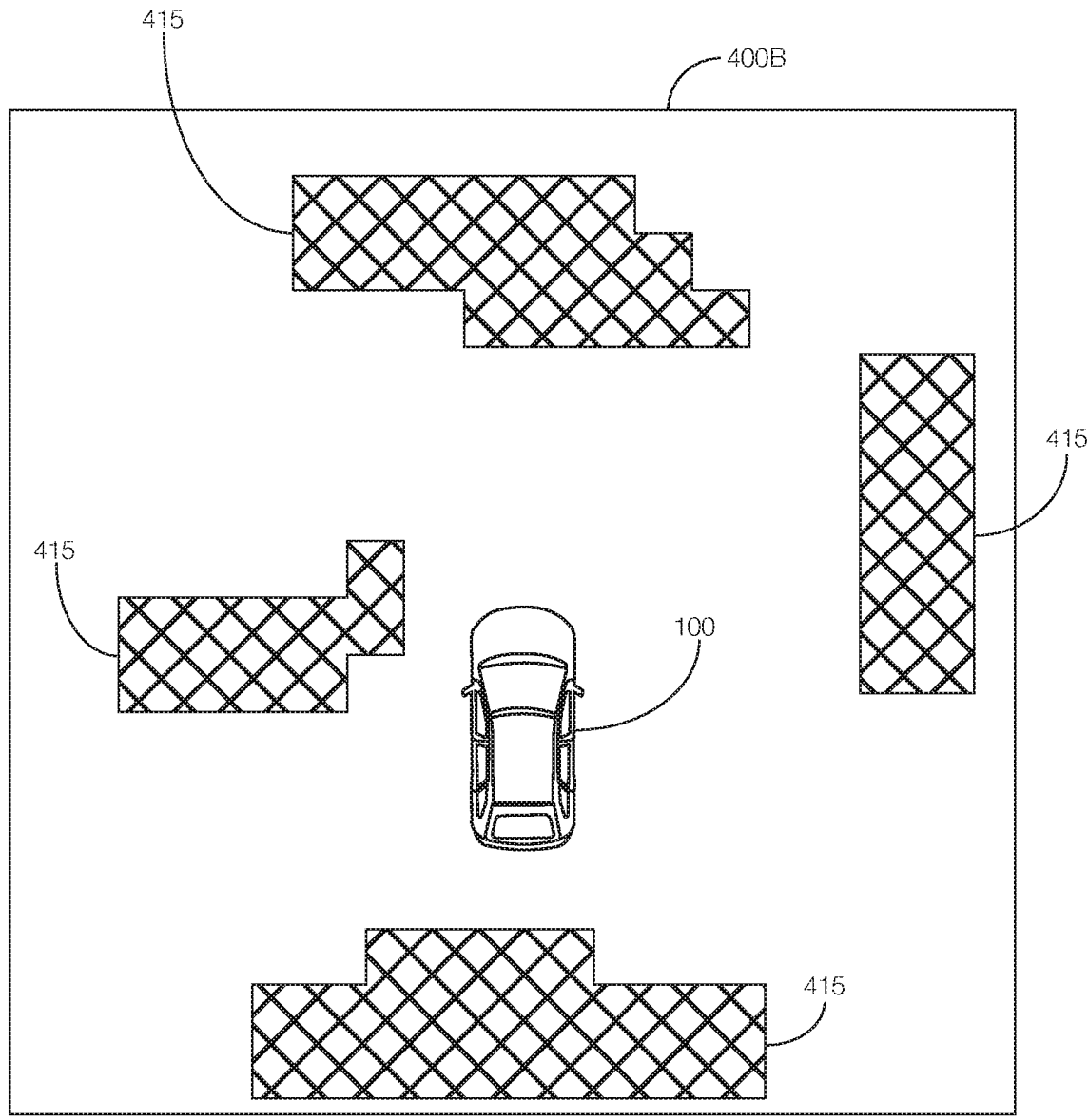
Figure 4C:
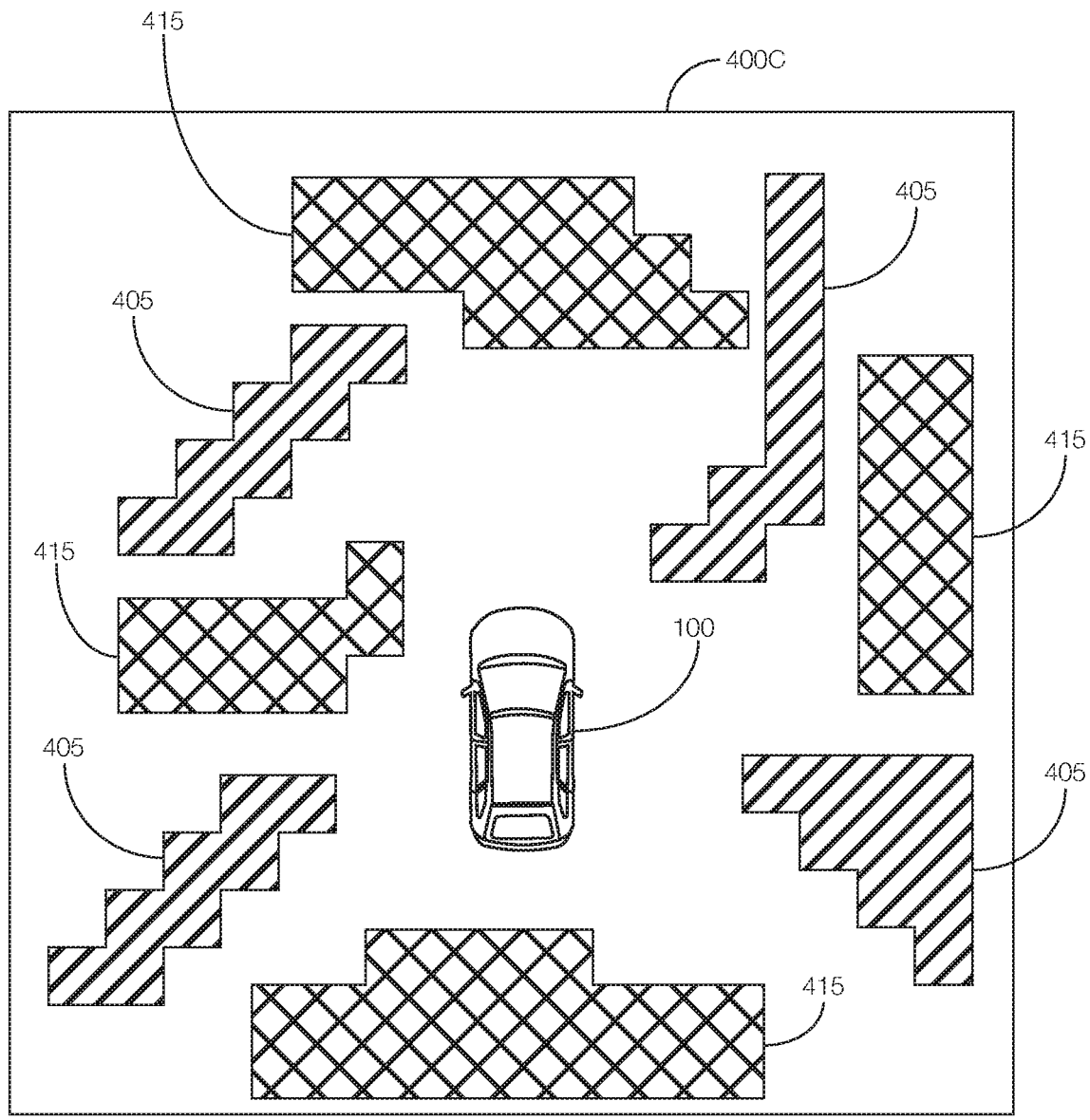

FIGS. 4A-4C illustrate example maps 400A-400C, respectively, that may be generated by the computing device 105. The maps 400A-C may be used to develop a trajectory to a high friction surface after, e.g., the computing device 105 determines that the vehicle 100 is stuck on a low friction surface. That is, the computing device 105 may use a slip control process, such as the slip control process shown in the control diagram 300, to control the vehicle 100 to a selected high friction surface identified in one or more of the maps 400A-C.

FIG. 4A shows an example map 400A with obstacles 405 detected by the sensors 115 as well as a path range 410. Map 400A also includes a depiction of vehicle 100. The path range 410 is a region of map 400A that includes the depiction of vehicle 100 and trajectories, also referred to as paths herein, that vehicle 100 can safely travel without encountering obstacles 405. The path range 410 may be calculated by the computing device 105 and may be based on the locations of the obstacles 405 and the operating constraints (e.g., the size and turning radius) of the vehicle 100. In other words, the path range 410 may be based on the areas of the map the vehicle 100 can travel to from its current location while avoiding the obstacles 405 with some buffer. Map 400A can be created by combining passive sensor data and active sensor data associated with locations surrounding a vehicle 100. Sensor data can include active and passive color and IR video data, LIDAR data, RADAR data, proximity data from proximity sensors 115, location data from accelerometer sensors 115 or gyroscopic sensors 115. Obstacles 405 can be determined by computing device 105 processing active and passive sensor data with machine vision techniques to segment data points representing obstacles 405 from a background and estimate distances and directions from vehicle 100 to each obstacle 405. Determining a segmented size, distance and direction for obstacles 405 permits computing device to orthographically project sensor data corresponding to obstacles 405 onto map 300 based on the location of vehicle 100.

Machine vision techniques to segment active and passive sensor data include convolutional neural networks (CNNs). A CNN can be trained using example images annotated with ground truth. Ground truth is information regarding the correct determination and identification of objects in sensor data. Segmentation is a machine vision technique that determines and identifies objects in image data, including color video data and IR video data. Objects can include vehicles, pedestrians, barriers, curbs, buildings, signs, poles or terrain, etc. A CNN can be trained to segment input image data into objects and identify the objects based on their appearance and their location with respect to the sensor 115 that acquired the image data. Computing device 105 can determine obstacles 405 based on output objects from a CNN by comparing the identity of the object as determined by the CNN with a predetermined list of objects that includes curbs, poles, barriers, buildings, signs and terrain, for example.

Segmented objects corresponding to obstacles 405 can be orthographically projected onto map 400A by determining the location of the segmented objects with respect to vehicle 100. The location of the segmented obstacles 405 can be determined by combining segmented object data with range sensor 115 data such as LIDAR data, RADAR data, proximity data, or gyroscopic data based on the fields of view 210, 212, 214, 216 of the sensors 115. A CNN can be configured and trained to input segmented object data and LIDAR data, RADAR data, proximity data or gyroscopic data and combine the data to identify the range and direction to the obstacles 405. A CNN can be trained by inputting object data and corresponding range data along with ground truth information regarding the object data.

Once the location of object data identified as an obstacle 405 with respect to the vehicle 100 is determined, data points associated with an obstacle 405 can be projected onto map 400A to transform obstacles 405 from a view based on the original field of view 210, 212, 214, 216 to a top down view as in map 400A by projecting the data points of the obstacles 405 based on the location of the object data in 3D space relative to the location 302 of the vehicle 110. Data points corresponding the object data can be projected along parallel lines arranged perpendicular to the plane of map 400A and thereby orthographically project the object data onto map 400A.

FIG. 4B shows an example map 400B of the locations of estimated high friction surfaces 415. The computing device 105 may estimate where the high friction surfaces 415 are located, and the result may be a map like map 400B. The estimated high friction surfaces may be areas that are not covered by snow, mud, ice, etc. as determined, by the computing device 105, from data collected by the sensors 115. Computing device 105 can determine locations of high friction surfaces 415 analyzing visual data from color or IR video sensors 115 and compare the reflectivity, color, and smoothness of the images against previously acquired image data for different surfaces. The confidence that the vehicle is traveling on a particular surface is related to the amount that acquired video data matches previously acquired and identified image data of that surface. For example, image data of a white reflective surface may match a previously acquired and identified image of a snowy surface. This method facilitates determining aspects of the surface by different sizes of features. For example, the method may distinguish small grains from large grains to differentiate between sandy or gravel surfaces from tile or rocky surfaces. This processing can be performed by computing device 105 using machine vision techniques that determine texture in image data by determining the size and distribution of regions having similar appearance. Additionally, with this method, the vehicle may construct luminosity maps to determine the nature of the surface. Different luminosity values are indicative of different surfaces. For example, dry asphalt may have one characteristic data value while wet asphalt may have another data value. A measured data value is compared to a table that indicates confidences of the different types of road surfaces give the input data value, for example.

In another example, computing device 105 can use active sensors 115 (e.g., LIDAR, RADAR, proximity) to emit signals that can reflect and refract off surfaces surrounding vehicle 100. Computing device 105 can process the patterns of reflections and refractions from the surfaces surrounding vehicle 100 to determine the type of surface and estimate the coefficient of friction. For example, the pattern of reflected or refracted data acquired by computing device 105 from active sensors 115 can determine whether a surface near vehicle 100 is smooth, (e.g., indicative of asphalt, ice, etc.) or rough (e.g., gravel or snow). Computing device 105 can also process environmental data (e.g., weather data, ambient temperature data, humidity data, precipitation data, etc.) Environmental data can be acquired by sensors 115 included in vehicle 100 or acquired from servers located remotely from vehicle 100 via the Internet or other wide area networking protocol. Environmental data can increase or decrease a confidence level associated with an estimate of a coefficient of friction determined with passive or active sensors 115. For example, environmental data can indicate that the temperature is below the freezing point of water, and therefore snow or ice is possible. Computing device 105 can combine data from active and passive sensors 115 with environmental data to generate an estimated coefficient of friction and generate a confidence level regarding the estimate.

FIG. 4C shows an example composite map 400C. The composite map 400C may include elements of the maps 400A and 400B. That is, the composite map 400C may be generated by combining portions of map 400A and map 400B. For instance, the composite map 400C shows the obstacles 405 and the locations of the high friction surfaces 415. In some instances, the map 400C may also show the path range 410. Using the map 400C, the computing device 105 can plan one or more trajectories from the present location of the vehicle 100 to one of the high friction surfaces 415. That is, the computing device 105 may select one of the high friction surfaces 415 based on, e.g., which high friction surface 415 is easiest for the vehicle 100 to navigate to while avoiding obstacles 405. Any high friction surfaces 415 that at least partially overlap the path range 410 (from FIG. 4A) may be candidates for the selected high friction surface 415. Put another way, the computing device 105 may be programmed to select the high friction surface 415 from among those that the vehicle 100 can navigate to via, e.g., the path range 410. This may be so even when the path range 410 is not included in the composite map 400C. The computing device 105 may develop a trajectory from the present location of the vehicle 100 to the selected high friction surface 415 and output various control signals consistent with, e.g., the control diagram 300 to free the vehicle 100 from the low friction surface and get the vehicle 100 to the high friction surface 415. Once at the selected high friction surface, the slip control process may end and the computing device 105 may return to normal (i.e., more conventional) autonomous control the vehicle 100.

Further, in some instances, the computing device 105 may be programmed to continually update the maps 400A-C. That is, the computing device 105 may be programmed to update any one or more of the maps 400A-C as the computing device 105 attempts to free the vehicle 100 from the low friction surface so, e.g., the computing device 105 can account for new obstacles 405, newly estimated high friction surfaces 415, newly detected low friction surfaces, etc. In some instances, the computing device 105 may select a new high friction surface 415 that is discovered after the computing device 105 selects an initial high friction surface.

Figure 5:
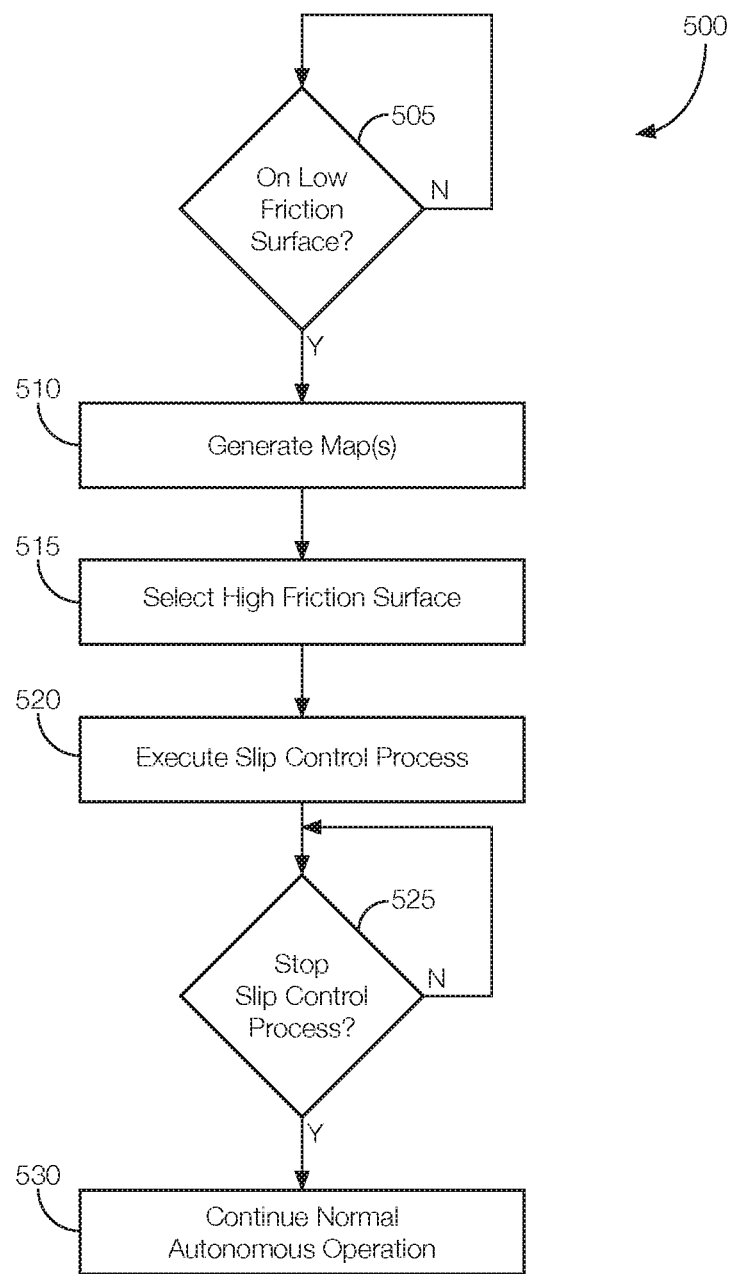
FIG. 5 is a flowchart of an example process that may be executed by the autonomous vehicle controller to plan the vehicle trajectory to the high friction surface.

FIG. 5 is a flowchart of an example process 500 that may be executed by the computing device 105. The process 500 may be executed at any time while the vehicle 100 is operating autonomously. The process 500 may continue to execute so long as the vehicle 100 continues to operate in an autonomous mode.

At decision block 505, the computing device 105 determines if the vehicle 100 is on a low friction surface. The computing device 105 may be programmed to determine that the vehicle 100 is on the low friction surface based on signals output by the sensors 115. For instance, the computing device 105 may be programmed to determine that the vehicle 100 is on the low friction surface based on internal states of the vehicle 100 such as, e.g., wheel speed, wheel orientation, and engine and transmission values. If the computing device 105 determines that the vehicle 100 is on a low friction surface, the process 500 may proceed to block 510. Otherwise, block 505 may be repeated until the computing device 105 determines that vehicle 100 is on a low friction surface or the process 500 ends.

At block 510, the computing device 105 generates at least one map. The computing device 105 may be programmed to generate one or more maps that include obstacles detected by the sensors 115. That is, the computing device 105 may be programmed to identify any objects detected by the sensors 115 as obstacles and generate the map to show the locations of the obstacles. The computing device 105 may be programmed to generate multiple maps. A first map may include the obstacles and a path range. A second map may include the estimated locations of high friction surfaces. A third map may be a composite map showing, e.g., obstacles and the locations of high friction surfaces.

At block 515, the computing device 105 selects one of the high friction surfaces in the composite map. The computing device 105 may be programmed to select the high friction surface that the vehicle 100 is most likely to get to, given the present location of the vehicle 100, the locations of the obstacles, etc. The computing device 105 may further be programmed to consider whether other low friction surfaces are near the high friction surfaces. That is, the computing device 105 may prioritize high friction surfaces based on, e.g., whether the high friction surface is at least partially surrounded by low friction surfaces, obstacles, or a combination of both. The computing device 105 may further prioritize high friction surfaces ahead of the vehicle 100 over high friction surfaces behind the vehicle 100 to reduce the likelihood that the vehicle 100 will become stuck at the same low friction surface again. The process 500 may proceed to block 520 after the high friction surface is selected.

At block 520, the computing device 105 executes a slip control process to escape the low friction surface and move toward the selected high friction surface. The computing device 105 may be programmed, for example, to execute a slip control process such as the slip control process 300 discussed above and shown in FIG. 3. Additional details about the slip control process are discussed below.

At decision block 525, the computing device 105 determines whether to stop the slip control process at block 520. The computing device 105 may be programmed to determine whether the vehicle 100 has arrived at the selected high friction surface or otherwise escaped the low friction surface. The computing device 105 may be programmed to make such a determination based on the internal vehicle states detected while executing the slip control process 300, using location data (such as GPS data), or the like. Moreover, upon arriving at the selected high friction surface, the computing device 105 may be programmed to determine whether the selected high friction surface provides enough friction to operate the vehicle 100 without the slip control process 300. If the computing device 105 decides to stop the slip control process 300, the process 500 may proceed to block 530. Otherwise, the process 500 may continue to execute block 525. In instances where the computing device 105 determines that the vehicle 100 has reached the selected high friction surface but is still not able to get sufficient traction to control the vehicle 100 without the slip control process 300, the process 500 may return to block 520 or to block 510 so new maps can be generated, new high friction surfaces can be evaluated, a new high friction surface can be selected, and the slip control process 300 can be executed again.

At block 530, the computing device 105 continues normal autonomous operation of the vehicle 100. That is, the computing device 105 may stop executing the slip control process and begin outputting control signals to the actuators 110 based on the external signals received from the sensors 115 without relying on the slip control process 300 to control the vehicle 100. The process 500 may end after block 530.

The slip control process 300, mentioned above, allows the vehicle 100 to escape a low friction surface. The slip control process (sometimes referred to as "escape mode") involves controlling braking, powertrain torque, gear shifting, and steering inputs to free the vehicle 100 from a stuck condition, such as when the vehicle 100 is stuck in deep snow. The vehicle 100 can engage the escape mode automatically when it detects that the vehicle 100 is on a low friction surface. Alternatively, or in addition, the vehicle 100 can engage the escape mode in response to a user input provided by an occupant pressing a button or otherwise selecting the escape mode from inside the passenger compartment of the vehicle 100. The user input may be received via, e.g., an infotainment system. Further, in some instances, if the vehicle 100 detects that it is stuck, it may prompt the occupant, via the infotainment system, to activate the escape mode.

As a result of receiving the user input activating the escape mode, or as a result of the computing device 105 deciding that the vehicle 100 is stuck, the slip control process 300, described above, may begin. That is, the computing device 105, beginning with the steering wheel centered, may apply powertrain torque to the driven wheels, measuring wheel speed and wheel slip to control the wheel speed to an optimal target, as previously discussed. The computing device 105 shifts the gear toward the desired direction and continuously monitors the non-driven wheels to determine if they begin to spin. If the non-driven wheels being to spin, the computing device 105 may determine that the car is moving out of the stuck position. If the non-driven wheels do not spin, stop spinning, or slow to below a predetermined threshold, the computing device 105 shifts the gears and drives the vehicle 100 in the opposite direction to oscillate (e.g., rock) the vehicle 100, back-and-forth, until the driven wheels stop slipping and the non-driven wheels roll normally. The computing device 105 may further test various steering angles to try to find a path out of the stuck condition, especially if the attempts to rock the vehicle 100 fail to make significant progress. The autonomous driving sensors can be used to avoid collisions with nearby objects during this slip control process, as previously discussed.

If the computing device 105, operating in the escape mode, fails to free the vehicle 100 after a set number of attempts, or if the non-driven wheels are not able to gain peak speed, the computing device 105 may report "unable to escape," which could include returning control to the driver (assuming an occupant is present) and can also make suggestions to the driver on how best to escape. Some driver inputs, such as brake pedal depress, accelerator depress, steering wheel angle, may cause the computing device 105 to exit the escape mode and give full control back to the driver. Other conditions that may cause the vehicle to exit the escape mode are battery voltage below a set threshold, fuel level below a set threshold, if certain diagnostic trouble codes are set, or if a collision is imminent or occurs.

With this approach, the computing device 105 tests different steering wheels and angles as the vehicle 100 is rocked back-and-forth while monitoring the wheel speed of both driven and non-driven wheels. The computing device 105 looks for the wheels speeds of the driven and non-driven wheels to converge for a certain period of time as opposed to just monitoring the driven wheels and vehicle acceleration.

An example slip control process, performed during the escape mode, may be as follows. Initially, the computing device 105 may determine if the vehicle 100 needs to move forward or backward from its current location. Moreover, the computing device 105 may initialize a counter that counts the number of times (i.e., iterations) the computing device 105 will attempt to free the stuck vehicle 100.

After selecting the direction and initializing the counter, the computing device 105 may take a rolling average of the non-driven wheel speeds to estimate the velocity of the vehicle 100. The non-driven wheel speeds may have some marginal slip relative to the slip of the driven wheel speeds. The rolling average may be used to remove noise in the data, such as from the road surface variation caused by, e.g., snow. The computing device 105 may be programmed to detect that the rolling average velocity is decreasing and compare the rolling average to a predetermined threshold. As a result of determining that the rolling average is decreasing and has dropped below the predetermined threshold, the computing device 105 may determine the vehicle 100 is no longer gaining momentum to escape the stuck condition. The computing device 105 may compare the number of iterations in the counter to an attempt limit. If the attempt limit has not yet been reached, the computing device 105 may increment the counter and continue to determine the rolling average and compare that to the predetermined threshold, as described above. If the number of iterations meets or exceeds the attempt limit, the computing device 105 may shift the vehicle into the opposite gear (e.g., "reverse" if the vehicle 100 was previously trying to move forward; "drive" if the vehicle 100 was previously trying to move backward) and try again to free the stuck vehicle 100.

After the vehicle has been shifted into the opposite gear, the computing device 105 may begin to cause the vehicle 100 to accelerate. The computing device 105 may continue to calculate and monitor the rolling average velocity and determine if the rolling average velocity is decreasing and has dropped below the predetermined threshold. If so, the computing device 105 may again conclude that the vehicle 100 is not gaining enough momentum to escape. Then, the computing device 105 may increase the iteration and determine if the peak velocity of the vehicle 100 during each movement mode at the steering angle has been increasing. If so, the computing device 105 may return to attempting to free the stuck vehicle 100 in the target (e.g., previous) gear that causes the vehicle 100 to move in the original direction (e.g., the target direction). Otherwise, the computing device 105 may determine that the current steering angle is not helping the vehicle 100 escape. In that instance, the computing device 105 may command the vehicle 100 to attempt to free itself using a different steering angle, discussed in greater detail below. Also, the vehicle 100 may not be expected to escape from this direction (e.g., the direction of the opposite gear). If the rolling average velocity has exceeded a value for a given period of time, or if the calculated displacement is too far from the starting position, to avoid moving into an environmental hazard, the computing device 105 may command the vehicle 100 to change the gear back to the target direction and perform the part of the process associated with moving in the target direction, discussed above.

When a new steering angle is requested, the computing device 105 may vary the current angle by a calibrated amount. Making this request successive times may prevent the vehicle 100 from trying to free itself using the same steering angle as a failed attempt. At each new steering angle, the vehicle 100 may go into the normal oscillating motion (e.g., rocking back-and-forth) and attempt to free itself. If the steering angle fails, a new angle may be tested until a desired result is achieved or a failure condition exits the escape mode.

FIGS. 6A-6D illustrate an example vehicle 100 operating in the escape mode, discussed above, to escape a stuck condition. In examples where a vehicle 100 is stuck, for example in deep snow or mud, active and passive sensor data can be used by computing device 105 to make real-time maps that can be used to unstick vehicle 100. The vehicle 100 in FIGS. 6A-6D is on an uneven low friction surface (e.g., a muddy road, a snowy road, an icy road, etc.).

Figure 6A:
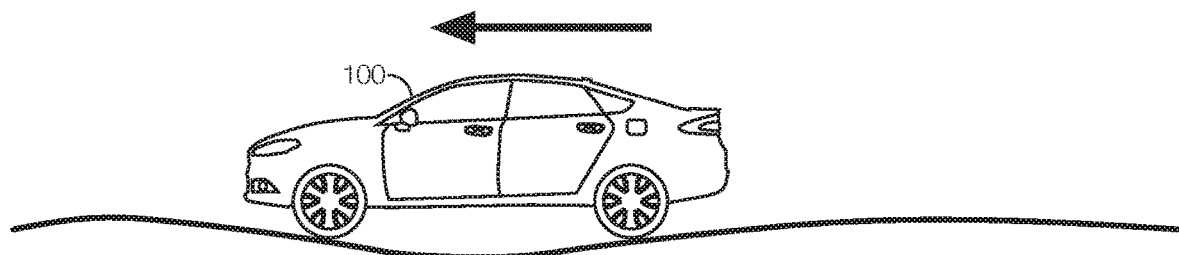
FIGS. 6A-6D illustrate an example autonomous vehicle performing an example slip control process on a low friction surface.
Figure 6B:
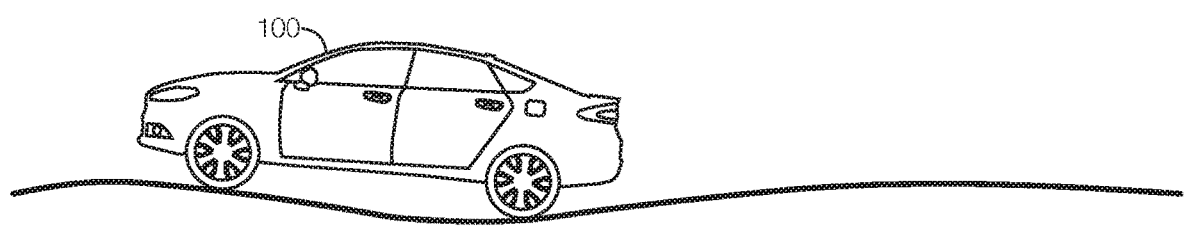
Figure 6C:
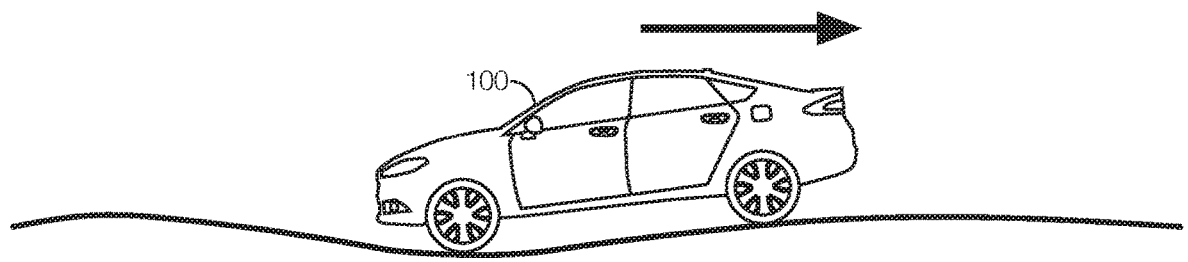
Figure 6D:
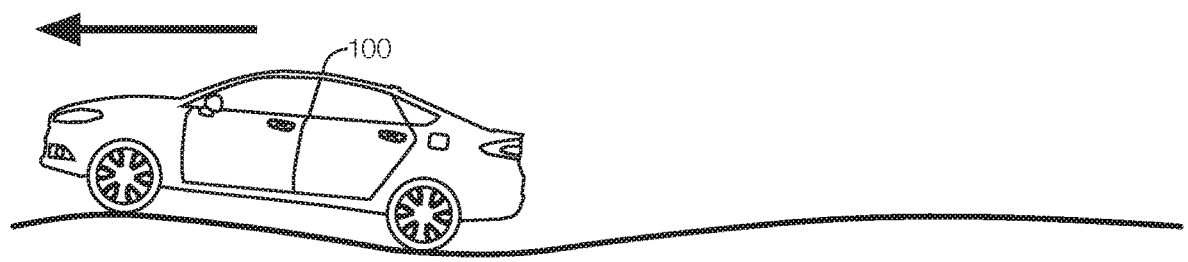

In FIG. 6A, the computing device 105 determines that the vehicle 100 is unable to progress normally (e.g., move in a straightforward manner). Thus, the computing device 105 initiates the escape mode and selects a target direction. The computing device 105 then rocks the vehicle 100 back-and-forth to attempt to make progress in the target direction. FIG. 6B illustrates an instance where the vehicle 100 is unable to make progress in the target direction. That is, the vehicle 100 is unable to clear the uneven road surface. In this instance, the computing device 105 switches to the opposite gear (reverse in the view shown in FIG. 6B). With reference to FIG. 6C, the computing device 105 commands the vehicle 100 to accelerate backwards so that the vehicle 100 can have additional energy to clear the uneven road surface. Referring to FIG. 6D, the vehicle 100 is free after multiple iterations of FIGS. 6A-6C (e.g., multiple iterations of building energy by rocking the vehicle 100 back and forth). That is, in FIG. 6D, the vehicle 100 has gained enough momentum to overcome the stuck condition (e.g., clear the uneven road surface despite it being low friction). Once clear, the vehicle 100 is free to continue in the target direction.

This approach, when combined with the generation of the composite map, give the computing device 105 a greater chance at freeing the vehicle 100 from a stuck condition. A stuck condition can be determined by determining a slip ratio for a driven wheel of vehicle 100 as defined above in equation (1). To permit computing device 115 to unstick vehicle 110, a slip target can be determined, where slip target is defined as the desired slip ratio that a slipping wheel is being controlled to by the computing device 115. A driven wheel is a wheel of a vehicle 100 operatively connected to the powertrain of vehicle 100, whereby torque or can be applied to the driven wheel to cause vehicle 100 to move. Linear motion of the wheel is determined to be motion of the wheel where the axle of the wheel is moving in a plane parallel to the plane of the roadway immediately underneath the wheel. This includes linear motion parallel to the roadway when the roadway is uneven, or the wheel is moving on snow or mud accumulated on the roadway. When the linear motion per second is equal to the rotary motion per second, expressed in terms of the circumference of the wheel per second, the slip ratio can range from 100% wherein the full rotational motion of the wheel is converted into linear motion to 0%, when the vehicle's 110 driven wheels can be stuck on ice or in snow or mud, for example, wherein no linear motion of the wheel results from any rotational motion of the wheel. The slip ratio can be used to estimate a coefficient of friction ($\mu$) between a wheel and a roadway, for example.

Computing devices such as those discussed herein generally each include commands executable by one or more computing devices such as those identified above, and for carrying out blocks or steps of processes described above. For example, process blocks discussed above may be embodied as computer-executable commands.

Computer-executable commands may be compiled or interpreted from computer programs created using a variety of programming languages and/or technologies, including, without limitation, and either alone or in combination, Java™, C, C++, Visual Basic, Java Script, Perl, HTML, etc. In general, a processor (e.g., a microprocessor) receives commands, e.g., from a memory, a computer-readable medium, etc., and executes these commands, thereby performing one or more processes, including one or more of the processes described herein. Such commands and other data may be stored in files and transmitted using a variety of computer-readable media. A file in a computing device is generally a collection of data stored on a computer readable medium, such as a storage medium, a random access memory, etc.

A computer-readable medium includes any medium that participates in providing data (e.g., commands), which may be read by a computer. Such a medium may take many forms, including, but not limited to, non-volatile media, volatile media, etc. Non-volatile media include, for example, optical or magnetic disks and other persistent memory. Volatile media include dynamic random access memory (DRAM), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

All terms used in the claims are intended to be given their plain and ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

The term "exemplary" is used herein in the sense of signifying an example, e.g., a reference to an "exemplary widget" should be read as simply referring to an example of a widget.

The adverb "approximately" modifying a value or result means that a shape, structure, measurement, value, determination, calculation, etc. may deviate from an exact described geometry, distance, measurement, value, determination, calculation, etc., because of imperfections in materials, machining, manufacturing, sensor measurements, computations, processing time, communications time, etc.

In the drawings, the same reference numbers indicate the same elements. Further, some or all of these elements could be changed. With regard to the media, processes, systems, methods, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

What is claimed is:

1. A method, comprising:
generating a map including obstacles and an estimated coefficient of friction between vehicle wheels and a roadway surrounding a stuck vehicle based on sensor data;
determining a path based on the map; and
operating the stuck vehicle based on the path and a slip control process based on the vehicle wheels.

2. The method of claim 1, wherein the estimated coefficient of friction between the vehicle wheels and the roadway is lower than a value that was empirically determined to permit operation of the stuck vehicle.

3. The method of claim 2, further comprising determining a slip ratio based on vehicle wheel motion parallel to the roadway and vehicle wheel rotation to determine the slip control process.

4. The method of claim 3, further comprising determining the slip control process to permit the stuck vehicle to operate based on the path and a determined slip ratio despite the estimated coefficient of friction.

5. The method of claim 4, further comprising matching a slip ratio of vehicle wheels to determine the stuck vehicle is unstuck.

6. The method of claim 1, further comprising generating the map including generating a first map based on vehicle sensor data including obstacles.

7. The method of claim 6, further comprising generating the map including generating a second map based on vehicle sensor data including estimating coefficients of friction for locations surrounding the stuck vehicle.

8. The method of claim 7, further comprising combining the first map and the second map and determining the path based on the combined first map and second map.

9. The method of claim 1, wherein vehicle sensor data includes passive sensor data and active sensor data.

10. A system, comprising:
a processor; and
a memory, the memory including instructions to be executed by the processor to:
generate a map including obstacles and an estimated coefficient of friction between vehicle wheels and a roadway surrounding a stuck vehicle based on sensor data;
determine a path based on the map; and
operate the stuck vehicle based on the path and a slip control process based the vehicle wheels.

11. The system of claim 10, wherein the estimated coefficient of friction between the vehicle wheels and the roadway is lower than a value that was empirically determined to permit operation of the stuck vehicle.

12. The system of claim 11, further comprising determining a slip ratio based on vehicle wheel motion parallel to the roadway and vehicle wheel rotation to determine the slip control process.

13. The system of claim 12, further comprising determining slip control process to permit the stuck vehicle to operate based on the path and a determined slip ratio despite the estimated coefficient of friction.

14. The system of claim 13, further comprising matching a slip ratio of vehicle wheels to determine the stuck vehicle is unstuck.

15. The system of claim 10, further comprising generating the map including generating a first map based on vehicle sensor data including obstacles.

16. The system of claim 15, further comprising generating the map including generating a second map based on vehicle sensor data including estimating coefficients of friction for locations surrounding the stuck vehicle.

17. The system of claim 16, further comprising combining the first map and the second map and determining the path based on the combined first map and second map.

18. The system of claim 10, wherein vehicle sensor data includes passive sensor data and active sensor data.

19. A system, comprising:
means for acquiring sensor data;
means for controlling stuck vehicle steering, braking and powertrain;
computer means for:
generating a map including obstacles and an estimated coefficient of friction between vehicle wheels and a roadway surrounding the stuck vehicle based on sensor data acquired by the means for acquiring sensor data;
determining a path based on the map; and
operating the stuck vehicle based on the path and a determined slip ratio based on the vehicle wheels to unstick the stuck vehicle by the means for controlling the stuck vehicle steering, braking and powertrain.

20. The system of claim 19, wherein the estimated coefficient of friction between the vehicle wheels and the roadway is lower than a value that was empirically determined to permit operation of the stuck vehicle.

* * * * *